United States Patent [19]

Urban et al.

[11] Patent Number: 5,755,874
[45] Date of Patent: May 26, 1998

[54] PROCESS FOR PREPARING LINEAR UNSUBSTITUTED β-PHASE QUINACRIDONE PIGMENTS

[75] Inventors: Manfred Urban, Wiesbaden; Dieter Schnaitmann, Eppstein, both of Germany

[73] Assignee: Hoechst Aktiengesellschaft, Frankfurt, Germany

[21] Appl. No.: 834,725

[22] Filed: Apr. 1, 1997

[30] Foreign Application Priority Data

Apr. 2, 1996 [DE] Germany ............ 196 13 190.1

[51] Int. Cl.$^6$ .................................. C09B 48/00
[52] U.S. Cl. .................. 106/497; 106/495; 546/49; 546/56
[58] Field of Search ....................... 106/495, 497; 546/49, 56

[56] References Cited

U.S. PATENT DOCUMENTS

| | | | |
|---|---|---|---|
| 2,844,485 | 7/1958 | Struve | 106/497 |
| 2,969,366 | 1/1961 | Griswold et al. | 546/49 |
| 5,062,577 | 11/1991 | Schmitt et al. | 241/171 |
| 5,591,258 | 1/1997 | Urban et al. | 106/497 |

FOREIGN PATENT DOCUMENTS

| | | |
|---|---|---|
| 2141725 | 8/1995 | Canada. |
| 0655485 | 5/1995 | European Pat. Off.. |
| 0666288 | 8/1995 | European Pat. Off.. |
| 1150046 | 12/1963 | Germany. |
| 3716587 | 4/1988 | Germany. |

*Primary Examiner*—Mark L. Bell
*Assistant Examiner*—Scott L. Hertzog
*Attorney, Agent, or Firm*—Connolly and Hutz

[57] ABSTRACT

Process for preparing linear unsubstituted β-phase quinacridone pigments A process for preparing linear unsubstituted β-phase quinacridone pigments or pigment preparations, which comprises a) cyclizing 2,5-dianilinoterephthalic acid in polyphosphoric acid or polyphosphoric ester with a phosphorus pentoxide content of at least 84% by weight to form the quinacridone, b) subsequently hydrolyzing this quinacridone with water or with an aqueous mineral acid solution, preferably orthophosphoric acid solution, at a temperature of at least 40° C., preferably from 60° to 105° C., to form the crude quinacridone pigment which is predominantly in the α-phase, c) then heating the crude α-phase quinacridone pigment to a temperature between 120° and 200° C. in the presence of a from 0.1 to 3% strength by weight, preferably from 0.2 to 2% strength by weight, inorganic base in water and alkali-stable organic solvents, for the change of phase into coarsely crystalline crude β-phase pigment, and d) subjecting the coarsely crystalline crude β-phase quinacridone pigment, for the fine division to form a pigment or prepigment, to dry or wet milling; and then isolating the resulting finely divided β-phase pigment;

e) or subjecting the finely divided β-phase prepigment obtained in d) to a finish treatment in the presence of solvents, and then isolating the pigment.

12 Claims, No Drawings

PROCESS FOR PREPARING LINEAR UNSUBSTITUTED β-PHASE QUINACRIDONE PIGMENTS

DESCRIPTION

Process for preparing linear unsubstituted β-phase quinacridone pigments

The present invention is in the technical field of quinacridone pigments and relates to an environment-friendly process of preparing linear unsubstituted β-phase quinacridone pigments in high purity and with outstanding fastness properties.

Quinacridone pigments are high-fastness pigments for exacting demands. In practice, stringent requirements are placed on their fastness properties and coloristic properties. Consequently, the preparation and fine-division process is accorded great importance.

Processes for preparing linear unsubstituted β-phase quinacridone pigments have been known for a long time. On the industrial scale, they are prepared by oxidizing dihydroquinacridones in alkaline medium in the presence of solvents, with subsequent dry or wet milling of the resultant coarsely crystalline crude pigments, or by ring closure of 2.5-dianilinoterephthalic acid in polyphosphoric acid or polyphosphoric ester, with subsequent phase conversion and finishing of the resultant finely divided crude pigments with organic solvents.

In accordance with U.S. Pat. No. 2,844,485, the preparation involves subjecting the coarsely crystalline α-phase crude pigments, prepared by oxidation of dihydroquinacridones in alkali medium in the presence of solvents, to dry milling with salt and a liquid hydrocarbon. Owing to the high salt load of the resultant wastewaters, this process is ecologically objectionable and very expensive. A requirement of the process of U.S. Pat. No. 2,844,485 is the drying of the crude pigment, without which conversion to the β-phase is impossible.

DE-A-1 150 046 describes a process for preparing unsubstituted β-phase quinacridone pigments by heating 2.5-dianilinoterephthalic acid in polyphosphoric acid or polyphosphoric ester and subsequently treating the resultant finely divided, moist crude α-phase pigments in the presence of at least eight times the amount of an at least 5% strength alkali solution, based on the crude pigment, to effect conversion to the β-phase. The finely divided β-phase crude quinacridone pigments are subsequently converted into the pigment form by means of a solvent finish. The large amounts of alkali produced pollute the wastewater and render the process uneconomic.

U.S. Pat. No. 5,591,258 describes a process for preparing linear unsubstituted β-phase quinacridone pigments by heating 2.5-dianilinoterephthalic acid in polyphosphoric acid or polyphosphoric ester and then treating the finely divided, moist α-phase crude pigments, that are obtained in the course of hydrolysis in ice-water, with small amounts of alkali and solvent, to effect conversion to the β-phase and to the pigment form. Advantageously, the finely divided α-phase crude pigments are dispersed prior to the change of phase. The pigments obtained by this ecologically flawless procedure no longer entirely satisfy current requirements in terms of their fastness properties and coloristic properties.

CA-A-2 141 725 describes a fine-division process for β-phase quinacridone pigments by the aqueous beadmilling of coarsely crystalline crude quinacridone pigments prepared, in accordance with U.S. Pat. No. 2,969,366, by oxidizing dihydroquinacridones with salts of nitrobenzenesulfonic acid in alkaline medium in the presence of solvents. Because of the wastewater pollution incurred during the preparation of the crude quinacridone pigments, this process is, from today's standpoint, uneconomic and ecologically objectionable.

The object of the present invention was to provide an environment-friendly and cost-effective process for preparing β-phase quinacridone pigments in high purity and with outstanding fastness properties, such that the disadvantages of the prior art are overcome.

It has been found that β-phase quinacridone pigments are obtained in high purity and with outstanding fastness properties by conducting the ring closure of 2.5-dianilinoterephthalic acid in polyphosphoric acid or polyphosphoric ester with a phosphorus pentoxide content of at least 84% and treating the resultant highly pure, predominantly α-phase crude pigment in a from 0.1 to 3% strength by weight solution of an inorganic base in water and alkali-stable solvents at from 120° to 200° C., to change the phase, separating off the solvent and converting the coarsely crystalline crude β-phase pigment into the pigment form by dry or wet milling. Prior or subsequent to the change of phase it is possible to carry out a treatment with peroxodisulfates. Wet milling is advantageously carried out in the presence of pigment-dispersing agents (pigment dispersants). Dry and wet milling may be followed by a finish treatment with solvents and/or by treatment with peroxodisulfates.

The present invention provides a process for preparing linear unsubstituted β-phase quinacridone pigments or pigment preparations, which comprises a) cyclizing 2.5-dianilinoterephthalic acid in polyphosphoric acid or polyphosphoric ester with a phosphorus pentoxide content of at least 84% by weight to form the quinacridone, b) subsequently hydrolyzing this quinacridone with water or with an aqueous mineral acid solution, preferably orthophosphoric acid solution, at a temperature of at least 40° C., preferably from 60° to 105° C., to form the crude quinacridone pigment which is predominantly in the α-phase, c) then heating the crude α-phase quinacridone pigment to a temperature between 120° and 200° C. in the presence of a from 0.1 to 3% strength by weight, preferably from 0.2 to 2% strength by weight, inorganic base in water and alkali-stable organic solvents, for the change of phase into coarsely crystalline crude β-phase pigment, and d) subjecting the coarsely crystalline crude β-phase quinacridone pigment, for the fine division to form a pigment or prepigment, to dry or wet milling; and then isolating the resulting finely divided β-phase pigment;

e) or subjecting the finely divided β-phase prepigment obtained in d) to a finish treatment in the presence of solvents, and then isolating the pigment.

a and b) In the novel process, cyclization of 2.5-dianilinoterephthalic acid is conducted in polyphosphoric acid or polyphosphoric ester, for example methyl polyphosphate, with a phosphorus pentoxide content of at least 84% by weight, preferably from 84.1 to 85% by weight, corresponding to a phosphoric acid equivalent of more than 115%. Preparation of the polyphosphoric acid (ester) with a phosphorus pentoxide content of at least 84% by weight that is employed in accordance with the invention can be carried out by taking commercial polyphosphoric acid (ester) and adding an amount of phosphorus pentoxide such that the reaction mixture can still be stirred under the reaction conditions below.

Hydrolysis takes place in water or in dilute (up to 30% strength by weight aqueous) orthophosphoric acid. This produces the crude α-phase quinacridone pigments in high purity.

c) For change of phase to the β-phase, the suspension of the crude α-phase quinacridone pigments in an inert liquid medium is treated, in the presence of alkali-stable solvents and inorganic bases, at a temperature in the range between 120° and 200° C., preferably from 130° to 160° C., under elevated pressure for from 1 to 12 hours. The amount of solvent added may vary within wide limits. It is preferred to use from 0.5 to 10 times the amount by weight of the alkali-stable organic solvent, based on the weight of the crude α-phase pigment, so that relative to the liquid phase the concentration of the solution of said solvent in water is at least 5% by weight, to provide for complete transformation into the β-phase. In addition, from 0.01 to 0.5 times the amount by weight of an inorganic base (100%) is added, based on the finely divided crude α-phase pigment, so that the aqueous phase comprises an aqueous solution of the inorganic base with a concentration of from 0.1 to 3% by weight. After the change of phase is complete, the solvents used are advantageously recovered and reused.

Suitable inorganic bases for the change of phase are sodium hydroxide, potassium hydroxide, sodium carbonate, potassium carbonate and ammonia. Mixtures of said bases can also be used.

Suitable solvents for the change of phase are alkali-stable solvents such as, for example, $C_1$–$C_8$-alkanols and alicyclic alcohols, such as methanol, ethanol, n-propanol or isopropanol, n-butanol, isobutanol or tert-butanol, pentanols, hexanols, cyclohexanol; glycol ethers, such as monomethyl or monoethyl ethers of ethylene glycol or propylene glycol, or butylglycol, ethyldiglycol or methoxybutanol. Preferred organic solvents are $C_1$–$C_6$-alkanols, especially ethanol, propanols, butanols and pentanols; butanols are particularly preferred.

d) Dry milling takes place in a batchwise or continuous vibrating mill or roll mill under gentle milling conditions and with a low millbase charge. The millbase charge is defined as the ratio of the amount of millbase to the free volume of the bed of grinding media. The millbase charge is normally below 250 g of millbase per liter of free volume of the bed of grinding media, preferably from 50 to 150 g/l. It can of course also be higher. At a higher charge, technical problems may occur, and in many cases the coloristic aim is not achieved.

Milling in the vibrating mill takes place such that the grinding media perform essentially only rotating movements, and their kinetic energy is kept as low as possible through the choice of mass and size and through the speed of rotation (frequency) and amplitude. In addition, the mill is operated with a high proportion of grinding media and at a low millbase charge. The grinding charge is defined as the ratio of the volume of the bed of grinding media to the mill volume. It is more than 60% by volume.

Roll milling is preferably carried out with a grinding charge of from 40 to 60% by volume and at 70% of the critical speed of rotation. The kinetic energy is kept as low as possible through the choice of mass and size of the grinding media. In addition, the mill is operated at a low millbase charge.

Grinding media used include balls or cylinders of steel, corundum, porcelain, steatite, alumina, mixed oxides and quartz, with a diameter of from 3 to 20 mm. The milling temperature is generally below 100° C.

In addition to the abovementioned components the millbase may also include further customary additives, for example small amounts of water, pigment-based pigment dispersants, resins, salts of resins, and extenders. The additives can also be employed in emulsified, suspended and liquid form, since pulverulent substances are able to take up small amounts (up to about 5%) of liquid with no immediate, notable impairment to their property as a powder. To reduce the risk of a dust explosion it is possible to add small amounts of inorganic salts. It is particularly advantageous to use additives which are able to remain in the pigment after milling. The salts of the fatty acids and resins can be converted into the free acids and resins, respectively, after milling. The duration of milling depends on the requirements in terms of fineness. The residence time of the millbase in the vibrating mill is, depending on the fineness required, in general between 1 and 25 hours. A duration of from 1 to 15 hours proves to be expedient, preferably from 2 to 8 hours.

The residence time of the millbase in the roll mill, depending on the fineness required, is in general between 5 and 100 hours. A duration of from 10 to 30 hours proves to be expedient, preferably from 15 to 25 hours. The additives can be added all at once or in a number of portions.

For wet milling, the suspension is diluted—directly or after its isolation in the form of a moist filter cake or as a dried, coarsely crystalline crude β-phase pigment—with water to a millable consistency.

For wet milling, all batchwise and continuous ballmills, roll mills and vibrating mills are suitable. In this context, a high milling action is advantageous. Grinding media used are balls of zirconium oxide, zirconium mixed oxide, alumina, steel or quartz, with a diameter of from 0.2 to 20 mm. Ballmills are particularly suitable. For the novel preparation of the quinacridone pigments a high milling action is required, which is achieved by the use of specific embodiments of the ballmills. Examples of ballmills which are suitable for milling to the desired efficiency are those which are designed for batchwise or continuous operation, which have a cylindrical or hollow-cylindrical milling chamber in horizontal or vertical construction, which can be operated at a specific power density of more than 2.5 kW per liter of milling space and whose peripheral stirrer speed is more than 12 m/s. The constructional design ensures that the high milling energy is transferred to the millbase. Examples of mills suitable for this are described in DE-A-3 716 587. If the milling intensity of the mill is too low, then the good properties according to the invention, especially the high color strength and outstanding coloring properties of the pigments, are not obtained.

The energy output per unit time by the stirrer mechanism is transmitted to the millbase as disruption work and as frictional energy in the form of heat. In order readily to dissipate this large quantity of heat it is necessary to take constructional measures to keep the ratio of milling space to milling-chamber surface area (cooling area) as low as possible. At high throughputs milling is carried out in circulation and the heat is dissipated to the outside predominantly via the millbase.

When continuous ballmills are used for the fine-division process, the grinding media are separated from the millbase preferably by centrifugation, so that there is virtually no contact between the separation devices and the grinding media, thus making it possible to a large extent to prevent the separation devices from becoming blocked. In this case the ballmills are operated with a high grinding charge. In the case of the continuous ballmills, the milling chamber is filled almost completely with grinding media.

Examples of grinding media used for these mills are balls of zirconium oxide, zirconium mixed oxide, alumina, steel or quartz, with a diameter of less than 1 mm; expediently, grinding media with a diameter of from 0.2 to 1 mm are used, preferably from 0.3 to 0.6 mm.

When carrying out wet milling, small amounts of organic solvents and/or inorganic bases and/or surfactants and/or pigment dispersants are added if desired. To ascertain the appropriate milling conditions, preliminary experiments are necessary. Milling is preferably carried out in an aqueous medium and in an alkaline pH range. It can also be carried out in an aqueous medium with the addition of small amounts of an organic solvent, preferably up to 10% by weight, based on the overall millbase, in homogeneous mixture. It is also possible to carry out milling in an organic medium.

The pigment concentration in the millbase depends on the rheology of the suspension and is expediently not more than 30% by weight, preferably from 5 to 30% by weight, in particular from 5 to 20% by weight, of the millbase suspension.

Suitable inorganic bases are sodium hydroxide, potassium hydroxide, sodium carbonate, potassium carbonate, calcium hydroxide and ammonia. Mixtures of these bases can also be used.

Suitable organic solvents which are advantageously added to the millbase suspension are water-miscible $C_1$–$C_8$-alkanols, such as methanol, ethanol, n-propanol, isopropanol, n-butanol, tert-butanol, isobutanol, pentanols, hexanols or alkylhexanols; cyclic alkanols, such as cyclohexanol; $C_1$–$C_5$-dialkyl ketones, such as acetone, diethyl ketone, methyl isobutyl ketone or methyl ethyl ketone, and cyclohexanone; ethers and glycol ethers, such as tetrahydrofuran, dimethoxyethane, methylglycol, ethylglycol, butylglycol, ethyldiglycol, methoxypropanol or methoxybutanol; aliphatic amides, such as formamide or dimethylformamide; cyclic carboxamides, such as N-methylpyrrolidone, valerolactam or caprolactam; heterocyclic bases, such as pyridine, morpholine or picoline, and also dimethyl sulfoxide, or mixtures of these solvents with water.

Particularly preferred for milling are water and solutions of $C_1$–$C_4$-alkanols in water, especially a solution of isobutanol in water.

Milling is carried out at temperatures in the range from 0° to 100° C., expediently at a temperature of between 10° and 60° C., preferably from 20° to 50° C.

The duration of milling is dependent on the fineness requirements of the particular area of application, for example the paints, printing or plastics sector. Depending on the required fineness the residence time of the millbase within the ballmill is, in general, between 5 and 150 minutes. A duration of from 5 to 45 minutes proves expedient, preferably from 10 to 30 minutes.

In the course of milling, the phase of the crude pigment employed is retained. After the milling operation, the crude pigments are present as finely divided prepigments or as pigments.

The particle size of the (pre)pigment particles is below 0.2 µm.

e) The millbases, present in the form of finely divided prepigments, are subjected to thermal treatment (solvent finish) in aqueous suspension, with or without the addition of inorganic bases and after the addition of organic solvents.

Suitable solvents for a finish operation are alkali-stable solvents such as, for example, $C_1$–$C_8$-alkanols and alicyclic alcohols, such as methanol, ethanol, n-propanol or isopropanol, n-butanol, isobutanol or tert-butanol, pentanols, hexanols, cyclohexanol; glycol ethers, such as monomethyl or monoethyl ethers of ethylene glycol or propylene glycol, or butylglycol, ethyldiglycol or methoxybutanol. Preferred organic solvents are $C_1$–$C_6$-alkanols, especially ethanol, propanols, butanols and pentanols; butanols are particularly preferred.

The conditions to be observed when carrying out the solvent finish are to a large extent dependent on the desired properties of the pigments and are in each case tailored accordingly. It is normal for the suspension of the prepigments or, following its isolation, the moist prepigment filter cake, to be treated in the inert liquid medium at a temperature in the range between 50° and 200° C. for from 1 to 12 hours for conversion to the pigment form. The amount of solvent added can be varied within wide limits. It is preferred to use from 1 to 5 times the amount by weight of solvent, based on the weight of the prepigment. The thermal treatment in the alkaline, aqueous-organic medium takes place preferably at from 50° to 150° C. for a period of from 1 to 6 hours. When the finish operation is at an end the solvents used can be recovered and used again. It is particularly economical to employ the same solvent for the change of phase and for the solvent finish.

For obtaining particular color effects it is possible, before or after the change of phase c), to carry out a treatment with peroxodisulfates at above 60° C. In this case, based on the pigment, it is expedient to add from 1 to 20% by weight of a peroxodisulfate. The peroxodisulfate can be added in solid form or as an aqueous-alkaline solution. The amount of alkali consumed by the oxidation with peroxodisulfates is compensated by the addition of alkali prior to or during the oxidation. Sodium, potassium or ammonium peroxodisulfate is suitable for this oxidation.

In order to enhance the coloristic properties it is also possible to add surfactants and/or pigment dispersants. The addition of the surfactants and pigment dispersants can be made all in one go or in a number of portions. Addition can be undertaken before, during or after milling, during or after the finish treatment, or during or after isolation. The most suitable point in time must be determined beforehand by means of guideline experiments.

Examples of suitable surfactants are cationic, anionic or nonionic surfactants, preferably fatty acid taurides, fatty acid sarcosides, fatty alcohol polyglycol ethers, alkylphenol polyglycol ethers, alkanesulfonic acids and their salts, alkylphenylsulfonic acids and their salts, and alkylphenol polyglycol ether sulfates. Also suitable are rheologically active additives, pigment dispersants based on quinacridone pigments, antifoams, and extenders.

Suitable pigment dispersants based on quinacridone pigments are compounds of the formula (I)

where P is an m-valent radical of a linear unsubstituted quinacridone, in which m is a number from 1 to 4, X is a group of the formula (II)

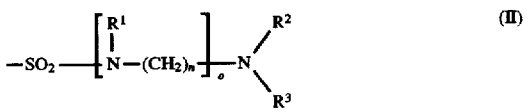

in which $R^2$ and $R^3$ independently of one another are each a hydrogen atom, a $C_1$–$C_{20}$-alkyl or $C_2$–$C_{20}$-alkenyl group or a $C_5$–$C_7$-cycloalkyl group, or in which $R^2$ and $R^3$, together with the adjacent nitrogen atom, form an aliphatic or aromatic, five- or six-membered heterocyclic ring having in each case 1 to 3 ring members comprising identical or different heteroatoms from the series consisting of nitrogen, oxygen and sulfur, $R^1$ is a hydrogen atom or a $C_1$–$C_4$-alkyl group, n is a number from 1 to 6, and o is 0 or 1.

By adding pigment dispersants, pigment preparations are obtained. In this context, the pigment dispersants are expediently added in an amount of from 1 to 10% by weight, based on the pigment.

Through the choice of milling conditions, of the organic solvent and of the inorganic base and their concentrations, the chosen temperature and the duration of the finish treatment it is possible, depending on the desired intended use, to prepare β-phase quinacridone pigments possessing either a relatively high transparency or a relatively high opacity. Through the amount of oxidizing agent it is possible to adjust the depth and shade of the color. At the same time, the color strength is increased.

The preparation of β-phase quinacridone pigments by the novel process has proven particularly economic and environment-friendly, since the change of phase involves the use of only small amounts of chemicals and solvents which can subsequently be processed further, completely regenerated or disposed of without problems, so that overall there are no waste disposal problems.

It was surprising that pure crude pigments are obtained only with polyphosphoric acids or polyphosphoric esters with a phosphorus pentoxide content of at least 84% by weight. Furthermore, it was not foreseeable that the complete transformation of the crude α-phase pigments to the β-phase would be successful with such small amounts of alkali in the presence of solvents, since under the conditions stated in DE-A-1 150 046 the change of phase is unsuccessful even with large amounts of alkali. Owing to their high purity, the pigments prepared in accordance with the invention are markedly superior to those of U.S. Pat. No. 5,591,258 in terms of their coloristic properties and the fastness properties.

The pigments obtainable in accordance with the present invention are notable for their outstanding coloristic and rheological properties, and especially flocculation stability, dispersibility, rheology, gloss characteristics, color strength and outstanding fastness to weathering, solvents and overcoating.

The pigments prepared in accordance with the invention can be used for the pigmentation of high molecular mass organic materials of natural or synthetic origin. Examples of high molecular mass organic materials which can be pigmented using these pigments are cellulose ethers and cellulose esters, such as ethylcellulose, nitrocellulose, cellulose acetate and cellulose butyrate, natural resins or synthetic resins, such as addition polymerization or condensation resins, for example amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, caseine, silicone and silicone resins, individually or in mixtures.

In this context it is unimportant whether the high molecular mass organic compounds mentioned are in the form of plastic masses or melts or in the form of spinning solutions, lacquers, extended formulations, paints or printing inks. Depending on the intended use it may prove advantageous to use the pigments that have been obtained in accordance with the invention as toners or in the form of preparations or dispersions. Based on the high molecular mass organic material to be pigmented, the pigment preparations and pigments prepared in accordance with the invention are expediently employed in an amount of from 0.1 to 10% by weight.

Particularly preferred coating systems are the new aqueous coating materials and also the low-solvent high-solids coating materials (i.e. with a high solids content). Also suitable are the conventional coating systems from the class of the alkyd melamine resin coatings, and two-component (two-pack) coatings based on acrylic and alkyd resins which can be crosslinked with polyfunctional isocyanates. The pigments prepared in accordance with the invention are readily dispersible, to high degrees of fineness, in numerous application media. Such pigment dispersions are of high flocculation stability and exhibit outstanding rheological properties even with a high level of pigmentation. They can be used to obtain coatings and prints of high color strength, high gloss and high transparency having excellent fastness properties.

To evaluate the properties in the paint sector of the pigments prepared in accordance with the invention, a selection was made from the large number of known lacquers of an alkyd-melamine resin (AM) lacquer based on a medium-oil alkyd resin and on a butanol-etherified melamine resin and containing aromatic compounds, and an aqueous polyurethane (PU)-based lacquer.

In order to evaluate the properties in the plastics sector of the pigments prepared in accordance with the present invention, plasticized polyvinyl chloride (PVC) was selected from among the large number of known plastics. The color strength and shade of color were determined in accordance with DIN 55986. The rheology of the millbase after dispersion was evaluated using the following five-step scale:

5 highly fluid
4 fluid
3 viscous
2 slightly set
1 set

After dilution of the millbase to the final pigment concentration, the viscosity was measured using the Rossmann "Viscospatula", type 301 from Erichsen, Iserlohn.

Gloss measurements were carried out on cast films having an angle of 20° in accordance with DIN 67 530 (ASTMD 523) using the multigloss®-glossimeter from Byk-Mallinckrodt, Wesel.

Determination of solvent fastness was in accordance with DIN 55976. Determination of bleed fastness was in accordance with DIN 53775. The determination of the crystal phase of the crude pigments, prepigments, pigments and pigment preparations was carried out by means of X-ray spectroscopy. The X-ray spectra were recorded with Cu Kα radiation. α-phase quinacridone pigments are understood as being those having the diffraction angles 6.12; 12.36; 13.94; 25.59 and 27.94 [2 theta]. β-phase quinacridone pigments are understood as those having the diffraction angles 5.65; 15.89 and 26.99 [2 theta]. Pictures of the corresponding X-ray diffraction diagrams are shown in U.S. Pat. No. 5,591,258.

In this patent application, parts and percentages are in each case by weight.

EXAMPLE 1 a and b) Ring closure and hydrolysis: 150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral. 754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100% pure) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of water and 6.4 parts of coarsely crystalline, unsubstituted crude quinacridone pigment (β-phase) and is operated at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water and dried at 80° C.

6.1 parts are obtained of pigment (β-phase). 6.1 parts of pigment are mixed mechanically with 0.61 part of pigment dispersant of the formula (I). In this formula (I) $R^1$ is a hydrogen atom, $R^2$ and $R^3$ are each an ethyl group, n is 3.0, o is 1.0 and mis2.0.

A pigment preparation is obtained which gives transparent coatings of high color strength in the AM lacquer. The rheology is assessed as being 5. The viscosity is 3.1 s and the gloss measurement gives the value 78. The solvent fastness is flawless.

EXAMPLE 2 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral. 754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100% pure) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength) and 6.3 parts of coarsely crystalline, unsubstituted crude quinacridone pigment (β-phase) and is operated at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.1 parts of pigment are obtained, which is in the β-phase. In PVC, readily dispersible, strong colorations with excellent bleed fastness are obtained. Determination of the purity of quinacridone: 10 parts of the pigment prepared as described above are introduced into 200 parts of concentrated sulfuric acid at <10° C. and are dissolved. Then 56 parts of water are added dropwise over the course of 1 hour. The mixture is then heated at 80° C. for 3 hours. It is cooled to 25° C. and the precipitate is filtered off with suction, washed with 75% strength sulfuric acid until the washings are clear, then is washed until neutral, and is dried at 80° C. 9.77 parts are obtained of pure quinacridone. The quinacridone obtained is therefore 97.7% pure.

EXAMPLE 3 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral. 693 parts are obtained of a crude, 19.4% pure pigment filter cake, which is predominantly in the α-phase.

c) Change of phase:

127.9 parts of the crude pigment filter cake are introduced into a stirred vessel, 147 parts of water, 2.6 parts of sodium hydroxide (98% pure) and 75 parts of isobutanol (100% pure) are added, and the mixture is heated at 150° C. for 1 hour under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

21.16 parts of highly crystalline crude pigment are obtained, which is in the α-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength), 6.3 parts of coarsely crystalline, unsubstituted crude quinacridone pigment (β-phase) and 0.32 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.2 parts are obtained of pigment preparation (β-phase) which gives transparent coatings of high color strength in the AM lacquer. The rheology is assessed as being 5. The viscosity is 3.2 s and the gloss measurement gives the value 84.

EXAMPLE 4 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

693 parts are obtained of a crude, 19.4% pure pigment filter cake, which is predominantly in the α-phase.

c) Change of phase:

127.9 parts of the crude pigment filter cake are introduced into a stirred vessel, 147 parts of water, 2.6 parts of sodium hydroxide (98% pure) and 75 parts of isobutanol (100%) are added, and the mixture is heated at 130° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

22.9 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength), 6.3 parts of coarsely crystalline, unsubstituted crude quinacridone pigment (β-phase) and 0.32 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.2 parts are obtained of pigment preparation (β-phase) which gives transparent coatings of high color strength in the AM lacquer. The rheology is assessed as being 5. The viscosity is 3.4 s and the gloss measurement gives the value 84.

EXAMPLE 5 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

138 parts of the crude pigment filter cake are introduced into a stirred vessel, 137 parts of water, 2.6 parts of sodium hydroxide (98% pure) and 12.3 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

24.4 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength), 6.3 parts of coarsely crystalline, unsubstituted crude quinacridone pigment (β-phase) and 0.32 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.2 parts are obtained of pigment preparation (β-phase) which gives transparent coatings of high color strength in the AM lacquer. The rheology is assessed as being 5. The viscosity is 3.4 s and the gloss measurement gives the value 84.

EXAMPLE 6 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 2270 parts of phosphoric acid (13.9% strength) at a temperature of 80° C. During this procedure, the temperature rises to 105° C. The mixture is stirred at 105° C. for 1 hour, and then the crude pigment is filtered off with suction and washed until neutral.

815.6 parts are obtained of a crude, 16.15% pure pigment filter cake, which is predominantly in the α-phase.

c) Change of phase:

185.8 parts of the crude pigment filter cake are introduced into a stirred vessel, 144.2 parts of water, 0.3 part of sodium hydroxide (98% pure) and 90 parts of isobutanol (100% pure) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

24.14 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength), 6.3 parts of coarsely crystalline, unsubstituted crude quinacridone pigment (β-phase) and 0.32 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.1 parts are obtained of pigment preparation (β-phase) which gives transparent coatings of high color strength in the AM lacquer. The rheology is assessed as being 5. The viscosity is 3.2 s and the gloss measurement gives the value 79.

EXAMPLE 7 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

760 parts are obtained of a crude, 17.4% pure pigment filter cake, which is predominantly in the α-phase.

c) Change of phase:

718 parts of the crude pigment filter cake are introduced into a stirred vessel. Subsequently 656 parts of water and 32.7 parts of sodium hydroxide (98% pure) are added. The mixture is heated at 90° C., and at this temperature a solution of 31.2 parts of water, 1.45 parts of sodium hydroxide (98% pure) and 8.33 parts of sodium peroxodisulfate is added. The mixture is stirred at 90° C. for 1 hour. Then 375 parts of isobutanol (100%) are added and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

120.75 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 80 parts of sodium hydroxide (1% strength) and 6.3 parts of coarsely crystalline, unsubstituted crude quinacridone pigment (β-phase). Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

5.6 parts are obtained of pigment preparation (β-phase). 5.6 parts of pigment are mixed mechanically with 0.28 part of pigment dispersant of the formula (I). In this formula (I) $R^1$ is a hydrogen atom, $R^2$ and $R^3$ are each an ethyl group, n is 3.0, o is 1.0 and m is 2.0.

A pigment preparation (β-phase) is obtained which gives transparent coatings of high color strength in the AM lacquer. The coatings are somewhat deeper in pure shade than that with the pigment prepared according to Example 1.

EXAMPLE 8 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a 17.75% pure crude pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A container made of plastic which is filled to 80% of its volume with 1400 parts of steatite cylinders with a diameter of 12 mm and a length of 12 mm as grinding media is charged with 30 parts of coarsely crystalline crude pigment (β-phase). Fine milling is carried out for 4 hours, with shaking, in a vibrating mill (Vibratom type; manufacturer: Siebtechnik Mühlheim) at 1400 revolutions per minute, with a circle of vibration of 4 mm. The millbase is then sieved to remove the grinding media. 23.2 parts of millbase are obtained.

e) Finish:

For the finish operation, 22 parts of the above millbase are introduced into 220 parts of isobutanol (85%), and 1.1 parts of pigment d spersant of the formula (I) are added. In this formula (I) $R^1$ is a hydrogen atom, $R^2$ and $R^3$ are each an ethyl group, n is 3.0, o is 1.0 and m is 2.0. The mixture is heated to boiling temperature and is stirred at boiling temperature for 5 hours. Subsequently the isobutanol is distilled off azeotropically by heating at up to 100° C. at the bridge, with simultaneous addition of water. After cooling to 60° C. the pigment preparation is filtered off with suction, washed with water and dried at 80° C.

22.8 parts of pigment preparation (β-phase) are obtained, which gives opaque coatings in the AM lacquer.

EXAMPLE 9 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A ballmill (manufacturer: Draiswerke GmbH, Mannheim) filled with 336 parts of zirconium mixed-oxide beads of diameter 0.3–0.4 mm as grinding media is fed with a suspension consisting of 76 parts of sodium hydroxide (1% strength), 19 parts of isopropanol and 6 parts of coarsely crystalline, unsubstituted crude quinacridone pigment (β-phase) and is operated at a peripheral stirrer speed of 15.6 m/s and with a specific power density of 3.1 kW per liter of milling space at 25° C. for 30 minutes. The millbase suspension is subsequently sieved to remove the grinding media, which are washed with water, the combined millbase suspensions are filtered with suction, and the solid product is washed with water until neutral and dried at 80° C. 6.0 parts of pigment (β-phase) are obtained, which are then mixed mechanically with 0.15 part of pigment dispersant of formula (I). In this formula (I) $R^1$ is a hydrogen atom, $R^2$ and $R^3$ are each an ethyl group, n is 3.0, o is 1.0 and m is 2.0. A pigment preparation is obtained which gives transparent coatings of high color strength in the AM lacquer. The rheology is assessed as being 5. The viscosity is 3.1 s and the gloss measurement gives the value 86.

EXAMPLE 10 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A ballmill (manufacturer: Draiswerke GmbH, Mannheim) filled with 336 parts of zirconium mixed-oxide beads of diameter 0.3–0.4 mm as grinding media is fed with a suspension consisting of 79 parts of sodium hydroxide (0.3% strength), 6 parts of coarsely crystalline, unsubstituted crude quinacridone pigment (β-phase) and 0.24 part of the sodium salt of an alkylphenol polyglycol ether sulfate. Milling is carried out at a peripheral stirrer speed of 15.6 m/s and with a specific power density of 3.1 kW per liter of milling space at 25° C. for 10 minutes. The millbase suspension is subsequently sieved to remove the grinding media, which are washed with water, the combined millbase suspensions are acidified with hydrochloric acid (10% strength), filtered off with suction, and the solid product is washed with water until neutral and dried at 80° C.

5.8 parts of pigment (13-phase) are obtained, which are then mixed mechanically with 0.15 part of pigment dispersant of formula (I). In this formula (I) $R^1$ is a hydrogen atom, $R^2$ and $R^3$ are each an ethyl group, n is 3.0, o is 1.0 and m is 2.0. A pigment preparation is obtained which gives transparent coatings of high color strength in the AM lacquer. The rheology is assessed as being 5. The viscosity is 3.1 s and the gloss measurement gives the value 81.

EXAMPLE 11 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the α-phase.

d) Milling:

A ballmill (manufacturer: Draiswerke GmbH, Mannheim) filled with 336 parts of zirconium mixed-oxide beads of diameter 0.3–0.4 mm as grinding media is fed with a suspension consisting of 79 parts of sodium hydroxide (1% strength) and 6.0 parts of coarsely crystalline, unsubstituted crude quinacridone pigment (β-phase) and is operated at a peripheral stirrer speed of 15.6 m/s and with a specific power density of 3.1 kW per liter of milling space at 25° C. for 30 minutes. The millbase suspension is subsequently sieved to remove the grinding media, which are washed with water, the combined millbase suspensions are filtered off with suction, and the solid product is washed with water until neutral and dried at 80° C.

5.9 parts of pigment (β-phase) are obtained, which are then mixed mechanically with 0.3 part of pigment dispersant of formula (I). In this formula (I) $R^1$ is a hydrogen atom, $R^2$ and $R^3$ are each an ethyl group, n is 3.0, o is 1.0 and m is 2.0.

A pigment preparation is obtained which gives transparent coatings of high color strength in the AM lacquer. The rheology is assessed as being 5. The viscosity is 3.6 s and the gloss measurement gives the value 84. The weathering fastness, flocculation stability and dispersibility are very good. The fastness to overcoating is excellent.

EXAMPLE 12 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A ballmill (manufacturer: Draiswerke GmbH, Mannheim) filled with 336 parts of zirconium mixed-oxide beads of diameter 0.3–0.4 mm as grinding media is fed with a suspension consisting of 73 parts of sodium hydroxide (1% strength), 4 parts of isobutanol (100%), 6.3 parts of coarsely crystalline, unsubstituted crude quinacridone pigment (β-phase) and 0.32 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.0 parts are obtained of pigment preparation (β-phase) which gives transparent coatings of high color strength in the AM lacquer. The rheology is assessed as being 5. The viscosity is 3.0 s and the gloss measurement gives the value 82.

EXAMPLE 13 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A container made of steel which is filled to 55% of its volume with 3200 parts of steel balls with a diameter of 10 mm as grinding media is charged with a suspension consisting of 119.7 parts of sodium hydroxide (1% strength), 9.8 parts of coarsely crystalline unsubstituted crude quinacridone pigment (β-phase) and 0.5 part of pigment dispersant of the formula (I). In this formula (I) $R^1$ is a hydrogen atom, $R^2$ and $R^3$ are each an ethyl group, n is 3.0, o is 1.0 and m is 2.0. Milling is carried out for 24 hours at 75% of the critical speed of rotation, on a roller bench. The millbase suspension is subsequently sieved to remove the grinding media, which are washed with water, the combined millbase suspensions are filtered with suction, and the solid product is washed with water until neutral and dried at 80° C.

9.7 parts of pigment preparation are obtained (β-phase), which gives opaque coatings in the AM lacquer.

EXAMPLE 14 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A container made of porcelain which is filled to 90% of its volume with 1200 parts of quartzite beads with a diameter of 2–3 mm as grinding media is charged with a suspension consisting of 200 parts by volume of isobutanol (85%), 10.0 parts of coarsely crystalline, unsubstituted crude quinacridone pigment (β-phase) and 0.5 part of pigment dispersant of the formula (I). In this formula (I) $R^1$ is a hydrogen atom, $R^2$ and $R^3$ are each an ethyl group, n is 3.0, o is 1.0 and m is 2.0. Fine milling is carried out for 12 hours, with shaking, in a vibrating mill (Vibratom type; manufacturer: Siebtechnik Mühlheim) at 1400 revolutions per minute, with a circle of vibration of 4 mm. The millbase is then sieved to remove the grinding media, which are washed with water, and the isobutanol is removed from the combined millbase suspensions by azeotropic distillation, with simultaneous addition of water, by heating at up to 100° C. at the bridge. After cooling to 60° C., the pigment preparation is filtered off with suction, washed with water and dried at 80° C.

8.4 parts are obtained of pigment preparation (β-phase) which gives opaque coatings of high color strength in the AM lacquer.

EXAMPLE 15 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the α-phase.

d) Milling:

A ballmill (manufacturer: Draiswerke GmbH, Mannheim) filled with 360 parts of zirconium mixed-oxide beads of diameter 0.3–0.4 mm as grinding media is fed with a suspension consisting of 77 parts of sodium hydroxide (1% strength), 6.4 parts of coarsely crystalline, unsubstituted crude quinacridone pigment (β-phase) and 0.64 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral.

34.0 parts are obtained of a 39.7% pure prepigment filter cake.

e) Finish:

For the finish operation, 34.0 parts of the above prepigment filter cake are introduced into a mixture of 75.5 parts of sodium hydroxide (1.75% strength) and 40.5 parts of n-butanol (100%). The mixture is heated to boiling temperature and is stirred at boiling temperature for 3 hours. The n-butanol is then distilled off azeotropically by heating at up to 100° C. at the bridge. After cooling to 60° C., the pigment preparation is filtered off with suction, washed with water and dried at 80° C.

13.5 parts are obtained of a pigment preparation (β-phase) which gives transparent coatings of high color strength in the AM lacquer.

EXAMPLE 16 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

724 parts are obtained of a crude, 18.15% pure pigment filter cake, which is predominantly in the α-phase.

c) Change of phase:

686 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge.

1456 parts of an 8.3% crude pigment suspension are obtained.

d) Milling:

A ballmill (manufacturer: Draiswerke GmbH, Mannheim) filled with 354 parts of zirconium mixed-oxide beads of diameter 0.3–0.4 mm as grinding media is fed with 83.5 parts of the above crude pigment suspension and 0.35 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and dried at 80° C.

6.5 parts are obtained of pigment preparation (β-phase) which gives transparent coatings of high color strength in the AM lacquer. The rheology is assessed as being 5. The viscosity is 3.4 s and the gloss measurement gives the value 89.

EXAMPLE 17 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the β-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength), 6.3 parts of coarsely crystalline, unsubstituted crude quinacridone pigment (β-phase) and 0.32 part of the pigment dispersant of the formula (I). In this formula (I) $R^1$ is a hydrogen atom, $R^2$ and $R^3$ are each an ethyl group, n is 3.0, o is 1.0 and m is 2.0. Milling is carried out at a peripheral stirrer speed of 15.6 m/s and with a specific power density of 3.1 kW per liter of milling space at 25° C. for 7.5 minutes. The millbase suspension is subsequently sieved to remove the grinding media, which are washed with water, the combined millbase suspensions are filtered with suction, and the solid product is washed with water until neutral and dried at 80° C.

6.2 parts are obtained of pigment preparation (β-phase) which gives opaque coatings of high color strength in the AM lacquer. The rheology is assessed as being 5. The viscosity is 3.1 s and the gloss measurement gives the value 82.

EXAMPLE 18 a and b) Ring closure and hydrolysis:

150 parts of 2,5-dianilinoterephthalic acid are introduced with stirring and at from 80° to 90° C. into 750 parts of polyphosphoric acid containing 84–85% $P_2O_5$, and the mixture is heated at 125° C. for 1 hour, during which ring closure to form the quinacridone takes place. The reaction mixture is then hydrolyzed, while stirring, with 3375 parts of water at a temperature of 80° C. During this procedure, the temperature rises to 105° C. The mixture is stirred at 105° C. for 1 hour, and then the crude pigment is filtered off with suction and washed until neutral.

754 parts are obtained of a crude, 17.75% pure pigment filter cake, which is predominantly in the α-phase.

c) Change of phase:

704 parts of the crude pigment filter cake are introduced into a stirred vessel, 670 parts of water, 12.9 parts of sodium hydroxide (98% pure) and 375 parts of isobutanol (100%) are added, and the mixture is heated at 150° C. for 5 hours under the pressure which becomes established in the closed vessel. After cooling to 90° C., the isobutanol is distilled off azeotropically at up to 100° C. at the bridge. The suspension is cooled to 60° C. and the crude pigment is filtered off with suction, washed with water until neutral and dried at 80° C.

116.5 parts of highly crystalline crude pigment are obtained, which is in the α-phase.

d) Milling:

A ballmill (manufacturer: Draiswerke GmbH, Mannheim) filled with 354 parts of zirconium mixed-oxide beads of diameter 0.3–0.4 mm as grinding media is fed with a suspension consisting of 77 parts of sodium hydroxide (1% strength) and 6.3 parts of coarsely crystalline, unsubstituted crude quinacridone pigment (β-phase) and is operated at a peripheral stirrer speed of 15.6 m/s and with a specific power density of 3.1 kW per liter of milling space at 25° C. for 15 minutes. The millbase suspension is subsequently sieved to remove the grinding media, which are washed with water, the combined millbase suspensions are filtered with suction, and the solid product is washed with water until neutral and is dried at 80° C.

18.3 parts are obtained of a 32.4% pure prepigment filter cake.

e) Finish:

For the finish operation, 18.3 parts of the above prepigment filter cake are introduced into a mixture of 48.3 parts of sodium hydroxide (1.25% strength) and 3 parts of isobutanol (100%). The mixture is heated to boiling temperature and is stirred at boiling temperature for 2 hours. The isobutanol is then distilled off azeotropically by heating at up to 100° C. at the bridge. After cooling to 60° C., the pigment preparation is filtered off with suction, washed with water and dried at 80° C.

5.9 parts are obtained of a pigment (β-phase). In PVC, readily dispersible colorations of high color strength and excellent bleed fastness are obtained. In the PU lacquer, coatings of very high color strength and good gloss are obtained.

We claim:

1. A process for preparing linear unsubstituted β-phase quinacridone pigments or pigment preparations, which comprises a) cyclizing 2,5-dianilinoterephthalic acid in polyphosphoric acid or a polyphosphoric ester with a phosphorus pentoxide content of at least 84% by weight to form the quinacridone, b) subsequently hydrolyzing this quinacridone with water or with an aqueous mineral acid solution at a temperature of at least 40° C. to form a crude quinacridone pigment which is predominantly in the α-phase, c) then heating said crude α-phase quinacridone pigment to a temperature between 120° and 200° C. in the presence of a from 0.1 to 3% strength by weight inorganic base in water and alkali-stable organic solvents, for the change of phase into coarsely crystalline crude β-phase pigment, and d) subjecting said coarsely crystalline crude β-phase quinacridone pigment, for a fine division to form a finely divided pigment or prepigment of the β-phase, to dry or wet milling; and then isolating the resulting finely divided β-phase pigment;

e) or subjecting the finely divided β-phase prepigment obtained in d) to a finish treatment in the presence of solvents, and then isolating the β-phase pigment.

2. The process as claimed in claim 1, wherein the phosphorus pentoxide content in the polyphosphoric acid or in the polyphosphoric ester is from 84 to 85% by weight.

3. The process as claimed in claim 1, wherein the change of phase is carried out using, based on the weight of the crude pigment, from 0.01 to 0.5 times the amount of the inorganic base.

4. The process as claimed in claim 1, wherein the concentration of the inorganic base in water in the course of the change of phase is between 0.2 and 2% by weight.

5. The process as claimed in claim 1, wherein the change of phase is carried out in the presence, based on the weight of the crude pigment, of from 0.5 to 10 times the amount of an alkali-stable organic solvent.

6. The process as claimed in claim 1, wherein alkali-stable organic solvents used are alkanols.

7. The process as claimed in claim 1, wherein alkali-stable organic solvents used are isopropanol or isobutanol.

8. The process as claimed in claim 1, wherein the change of phase is carried out at temperatures of from 130° to 160° C.

9. The process as claimed in claim 1, wherein peroxodisulfates are added prior or subsequent to the change of phase.

10. The process as claimed in claim 1, wherein wet milling is carried out in a ballmill at a power density of more than 2.5 kW per liter of milling space and with a peripheral speed of more than 12 m/s.

11. The process as claimed in claim 1, wherein the solvent finish is carried out in n-butanol or isobutanol at from 50° to 200° C.

12. The process as claimed in claim 1, wherein at any desired point in time in the course of the process one or more pigment dispersants of the formula (I) are added.

$$P-X_m \qquad (I)$$

where

P is an m-valent radical of a linear unsubstituted quinacridone, in which m is a number from 1 to 4, X is a group of the formula (II)

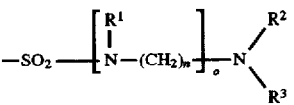

in which $R^2$ and $R^3$ independently of one another are each a hydrogen atom, a $C_1$–$C_{20}$-alkyl or $C_2$–$C_{20}$-alkenyl group or a $C_5$–$C_7$-cycloalkyl group, or in which $R^2$ and $R^3$, together with the adjacent nitrogen atom, form an aliphatic or aromatic, five- or six-membered heterocyclic ring having in each case 1 to 3 ring members comprising identical or different heteroatoms from the series consisting of nitrogen, oxygen and sulfur, $R^1$ is a hydrogen atom or a $C_1$–$C_4$-alkyl group, n is a number from 1 to 6, and o is 0 or 1.

* * * * *